US005241793A

United States Patent [19]

Armato

[11] Patent Number: 5,241,793

[45] Date of Patent: Sep. 7, 1993

[54] APPARATUS FOR ABRADING A REED FOR A MUSICAL INSTRUMENT

[76] Inventor: Ben N. Armato, 17 Sherbrooke Rd., Hartsdale, N.Y. 10530

[21] Appl. No.: 906,527

[22] Filed: Jun. 30, 1992

[51] Int. Cl.[5] ........ B23F 21/03

[52] U.S. Cl. ........ 51/205 R; 51/391; 51/205 WG; 51/214

[58] Field of Search ........ 51/57, 58, 59, 354, 51/391, 205 R, 205 WG, 211 R, 211 H, 214; 29/78, 79, 80; 269/134, 138, 217

[56] References Cited

U.S. PATENT DOCUMENTS 4,624,079 11/1986 Bonapace ........ 51/214

4,809,583 3/1989 Kume ........ 84/453

*Primary Examiner*—Bruce M. Kisliuk

*Assistant Examiner*—Eileen P. Morgan

*Attorney, Agent, or Firm*—Charles A. Blank; Frederick H. Rabin

[57] ABSTRACT

Apparatus for honing a clarinet reed includes a base having one or more longitudinally tapered ramps and an upper portion slidable on the one or more tapered ramps and having a substantially flat abrasive file adjacent and spaced from the top surface of the base. The top surface of the base has one or more transversely tapered portions.

6 Claims, 3 Drawing Sheets

FIG. 10
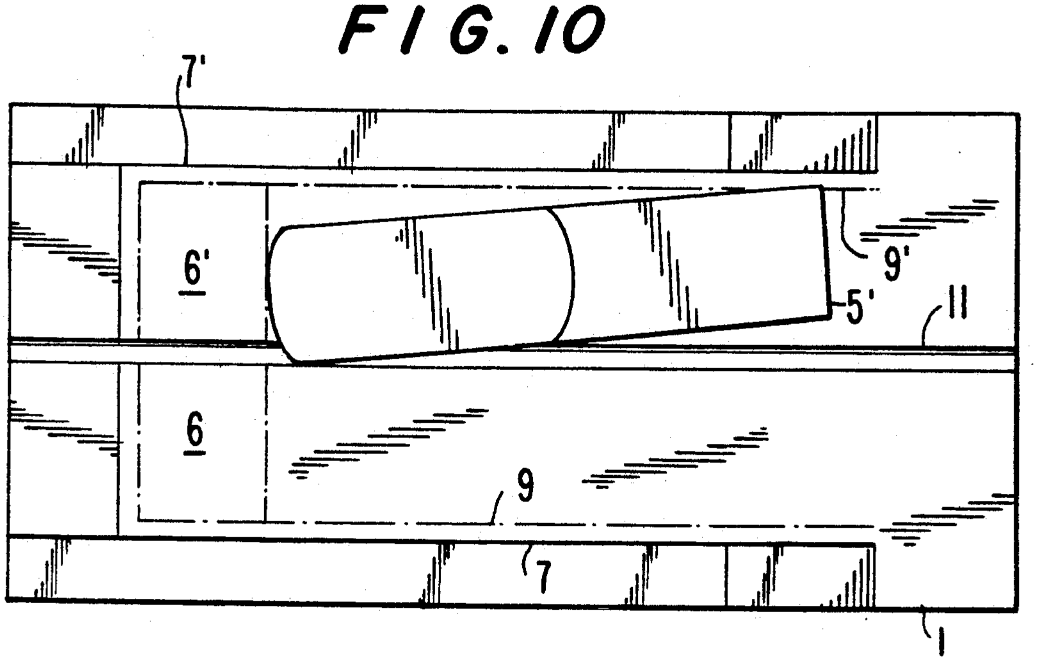
FIG. 11
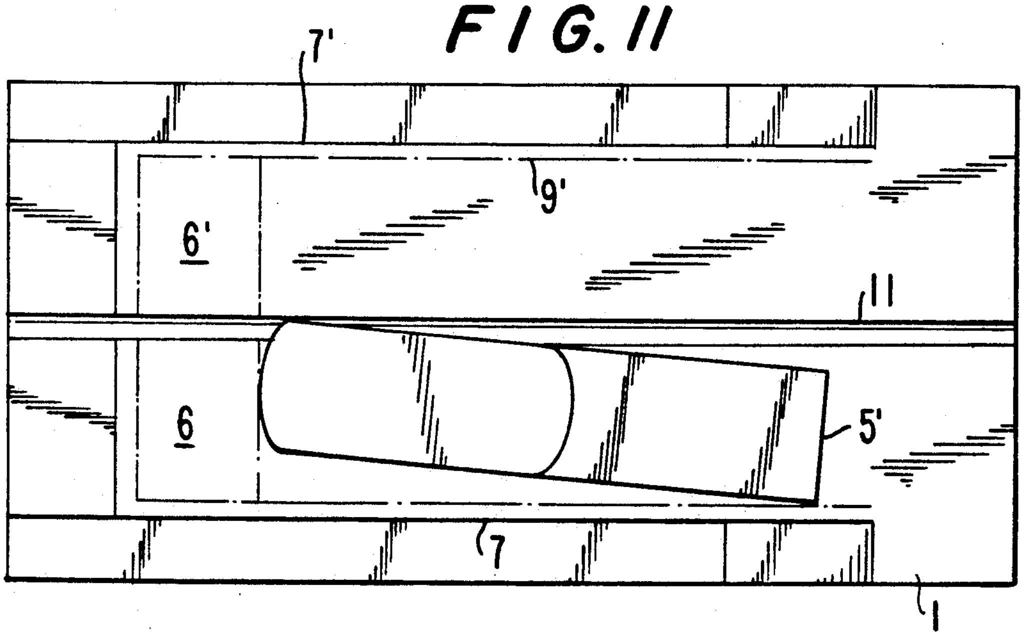
FIG. 13
FIG. 14
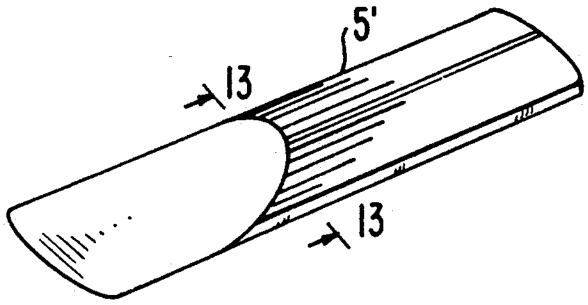

APPARATUS FOR ABRADING A REED FOR A MUSICAL INSTRUMENT

This invention relates to apparatus for abrading a reed for a musical instrument and, more particularly, to apparatus for honing a clarinet reed or reed for a similar musical instrument.

U.S. Pat. No. 4,809,583 relates to a device for adjusting a reed for a clarinet, or the like, the device having a reed guide base and an adjusting spatula having a curved end portion with a file bonded thereto for adjusting the thickness of the reed. The apparatus has the disadvantage that a spatula must be precisely held and moved by an operator. No variation of transverse abrasion is provided.

It is an object of the invention to provide a new and improved apparatus for abrading a reed for a musical instrument which avoids one or more of the above mentioned disadvantages of such prior apparatus.

It is another object of the invention to provide a new and improved apparatus for abrading a reed for a musical instrument which can be readily operated to provide precise abrasion according to the configuration desired by the operator who would ordinarily be the musician who will use the reed.

In accordance with the invention, apparatus for abrading a reed for a musical instrument comprises a base having one or more longitudinally tapered ramps and an upper portion slidable on said one or more tapered ramps and having a substantially flat abrasive portion adjacent and spaced from the top surface of the base. The top surface of the base has one or more transversely tapered portions.

For a better understanding of the invention, together with other and further objects thereof, reference is made to the following description, taken in connection with the accompanying drawings, and its scope will be pointed out in the appended claims.

Referring now to the drawings:

FIG. 10 is a plan view of the base of FIG. 1 showing the guidelines and a reed positioned obliquely on the base partially over a notch;

FIG. 11 is a plan view of the base of FIG. 1 showing the guidelines and a reed positioned obliquely on the base with an edge opposite to that of FIG. 10 positioned over the notch;

FIG. 12 is a perspective view of a reed after abrasion as in FIG. 10 and then in FIG. 11; and FIG. 13 is a sectional view of the FIG. 12 reed taken along the line 13—13 of FIG. 12.

Figure 1:
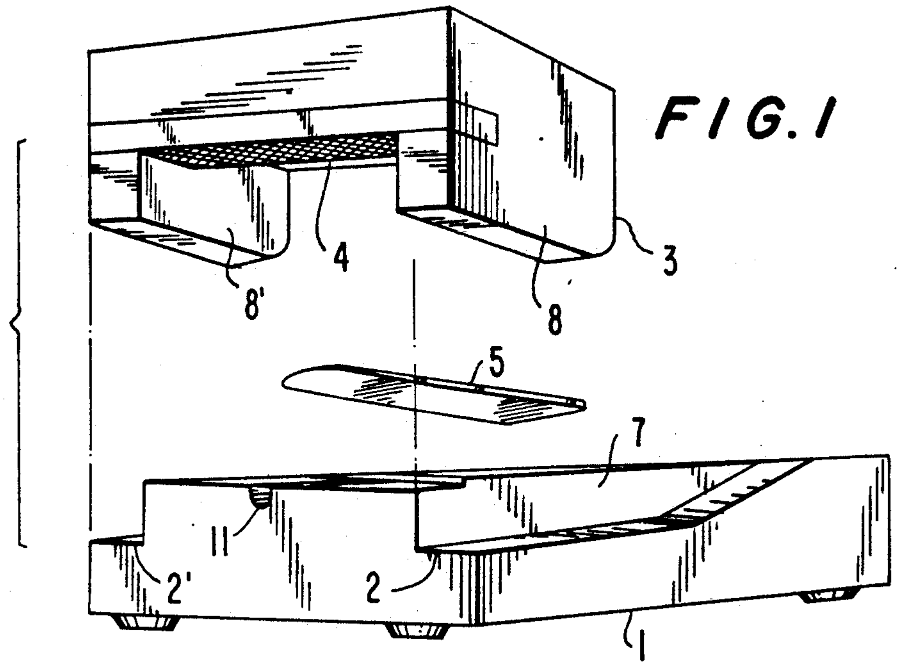
FIG. 1 is an exploded perspective view of abrading apparatus constructed in accordance with the invention and a reed for abrasion or honing.
Figure 2:
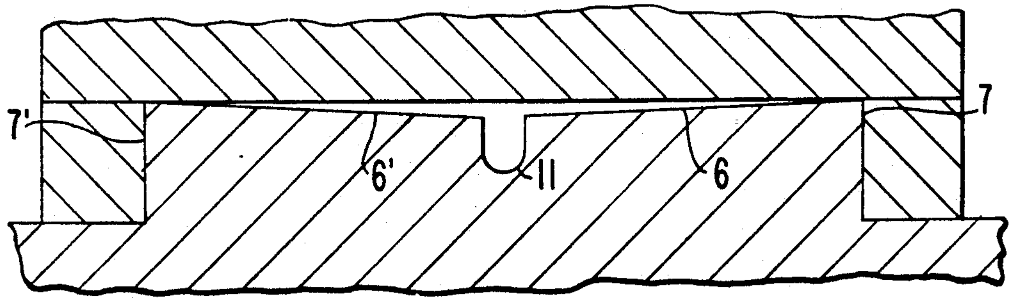
FIG. 2 is a sectional elevational view of the apparatus of FIG. 1.
Figure 3:
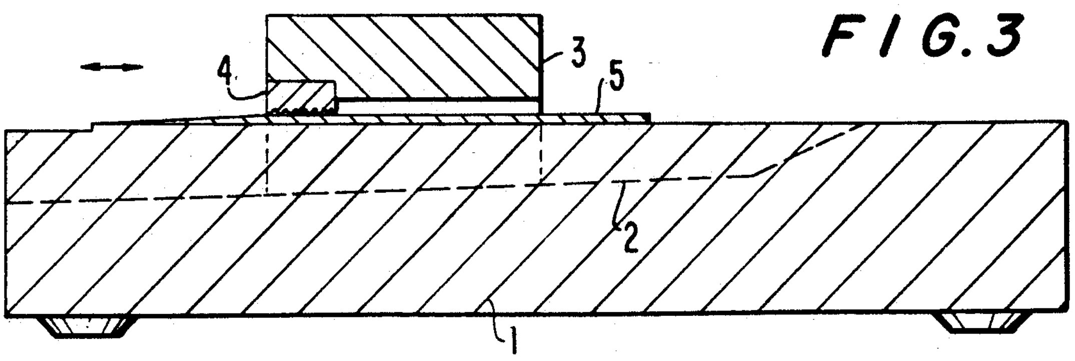
FIG. 3 is a sectional elevational view of the apparatus of FIG. 1 taken at a right angle to the sectional view of FIG. 2 and in operation abrading a reed.

Referring now more particularly to FIGS. 1, 2, 3 and 4, the apparatus for abrading a reed has a base 1 with two tapered ramps 2, 2' on which an upper portion 3 slides to bring file 4 in contact with reed 5. The upper portion 3 fits squarely on the tapered ranges 2, 2'. Accordingly the reed is tapered longitudinally as the upper portion 3 is moved in the direction of the arrow. Additionally, the surface 6, 6' is tapered by a few thousandths inch from a higher point at the outside edges of the base 1 toward the central notch 11 in the base 1. Preferably, the transverse tilt of the surface 6, 6' is such that every 1/16 th inch from the outside edges of the surface 6, 6' drops 0.001 inch.

Thus the top surface, 6, 6' of the base has opposite side edge surfaces 7, 7' and the base has two spaced parallel ramps 2, 2' adjacent the opposite side edge surfaces 7, 7' of the top surface 6, 6'.

The ramps 2, 2' in their regions of lesser slope preferably have an incline such that at the guideline 10 (FIG. 4) the incline is 0.006 inch and at subsequent 3/16 inch intervals the incline is 0.016 inch, 0.026 inch, 0.035 inch, 0.048 inch and 0.060 inch. The guideline 10 may, for example, be 21/32 inch from the guideline **10*a*** which may, for example, be substantially 3/32 inch distant from the adjacent end surface.

The upper portion 3 has two transversely spaced longitudinal legs 8, 8' supporting the upper portion on the ramps 2, 2' of the base. The top substantially flat abrasive portion 4 is spaced from the top surface by an adjustable distance as will be explained subsequently. The top surface of the base has opposite side edge surfaces 7, 7' and the transversely tapered portions 6, 6' of the top surface tilt transversely toward each other from the opposite side edge surfaces 7, 7'.

The ramps 2, 2' have regions of greater slope in order to raise the upper portion 3 and the flat abrasive portion 4 by a greater distance above the top surface of the base.

The substantially flat abrasive portion 4 preferably is a No. 2 Bastard file.

Figure 4:
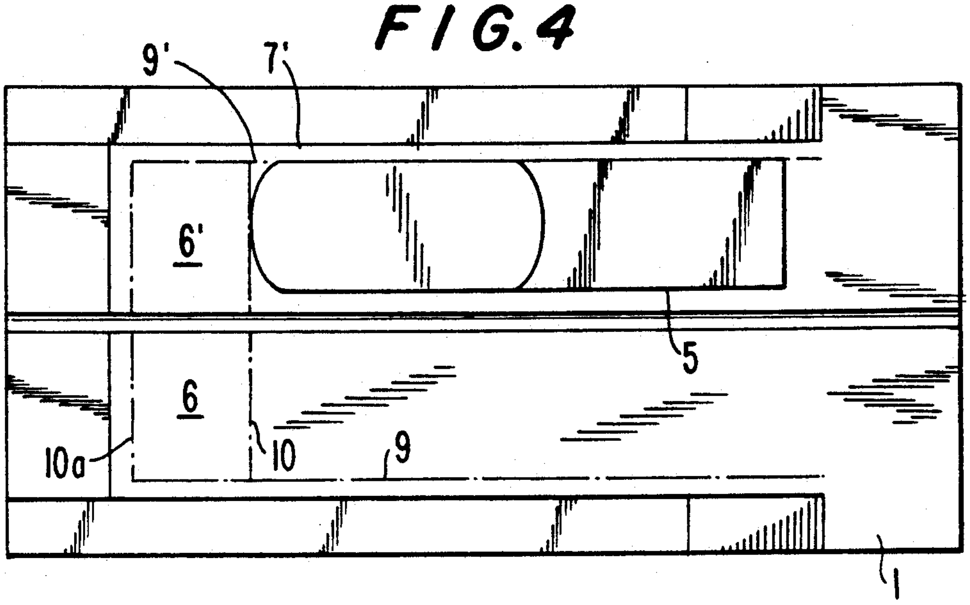
FIG. 4 is a plan view of the base of FIG. 1 showing the guidelines and a reed positioned on the base.

Referring now more particularly to FIG. 4, the top surface 6, 6' of the base has two opposite side edge surfaces 7, 7' and has two parallel visible longitudinal guidelines 9, 9', for example, each of substantially 1/16 inch distance from an adjacent side edge surface.

Figure 5:
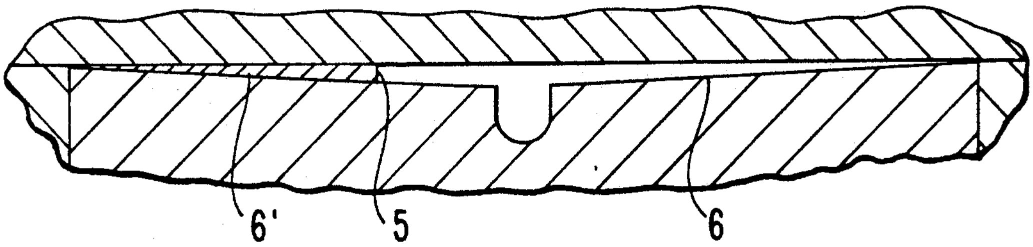
FIG. 5 is a fragmentary transverse sectional view of the FIG. 1 apparatus abrading a reed as positioned in FIG. 4.
Figure 6:
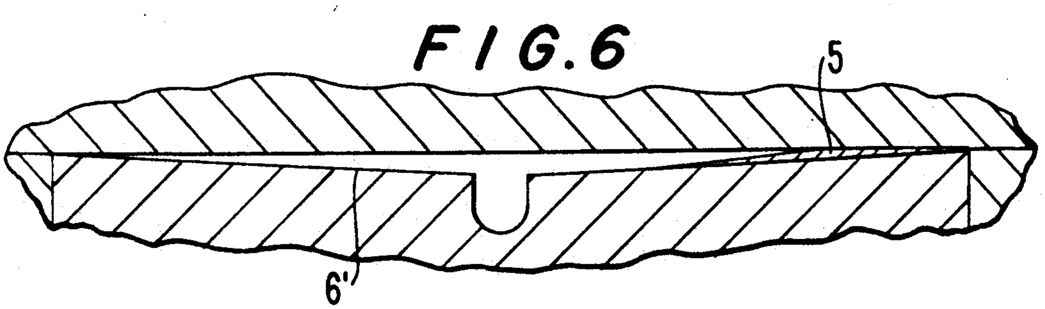
FIG. 6 is a fragmentary transverse sectional view of the FIG. 1 apparatus abrading the reed of FIG. 5 when positioned along the guideline 9.
Figure 7:
FIG. 7 is a transverse sectional view of the reed as abraded in FIG. 5.
Figure 9:
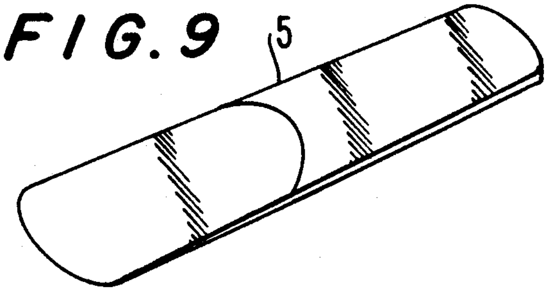
FIG. 9 is a perspective view of a reed after abrasion as shown in FIG. 5 and FIG. 6.
Figure 8:
FIG. 8 is a transverse sectional view of the reed when abraded as in FIG. 5 and then in FIG. 6.

The reed may be honed preferably by wetting it and by positioning as indicated in FIG. 5 along the longitudinal guideline 9 on one side 6, of the base and sliding the upper portion 3 back and forth to abrade one side of the reed as represented in FIG. 7. As represented in FIG. 6, the reed may then, for example, be moved to the other side 6 of the top surface of the base and abraded in a similar manner to provide a reed represented in FIGS. 8 and 9.

Also, to obtain a reed of different thickness the reed may be displaced longitudinally on the surface 6, 6' so that the file 4 makes contact with the reed at a different position of the upper portion 3 with the legs 8, 8, on the ramps 2, 2'.

The notch 11 in the top surface of the base serves a purpose to be explained in connection with FIGS. 10–12.

Referring now more particularly to FIG. 10 of the drawings, the individual clarinetist may desire to have a reed of a non-symmetrical cross-sectional shape at its tip to provide a given form of sound according to his individual taste. This may be accomplished as indicated in FIG. 10 by placing the reed 5' for abrasion obliquely with respect to the guideline 9' with one portion of the reed extending over the notch 11 so that there is no interference with that portion by the transverse surface 6. The reed may then be abraded by oscillating the upper portion 3 back and forth in a manner similar to that explained in connection with FIG. 4.

The reed 5' may then be placed on the surface 6 with an edge extending over the notch 11, thereby avoiding interference by the surface 6'. The upper portion 3 may be oscillated as explained in connection with FIG. 10 to form the finished reed 5', as represented in FIG. 12. As may be seen with reference to FIG. 13, the reed then has an asymmetrical shape.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for abrading a reed for a musical instrument, said apparatus comprising:

a base having a top surface, two opposite side edge surfaces, and two spaced longitudinally tapered parallel ramps adjacent said side edge surfaces, the top surface being provided with tapered portions tilted transversely toward each other from said side edge surfaces, and an upper portion slidable on the ramps, having two transversely spaced longitudinal legs for supporting said upper portion on said ramps, and a substantially flat abrasive portion adjacent and spaced from the top surface of the base.

2. Apparatus in accordance with claim 1 in which the substantially flat abrasive portion is spaced from the top surface of the base by an adjustable distance varying over a range of from 0.006 inch to 0.060 inch.

3. Apparatus in accordance with claim 1 in which the tilt of the transversely tapered portions is such that the level of the top surface drops about 0.001 inch for every 1/16 inch as measured from the side edge surface.

4. Apparatus in accordance with claim 1 in which said substantially flat abrasive portion is a No. 2 Bastard file.

5. Apparatus in accordance with claim 1 in which the top surface of the base has two parallel visible longitudinal guidelines, each of which is spaced about 1/16 inch distant from an adjacent side edge surface.

6. Apparatus in accordance with claim 1 in which the base has a central longitudinal notch extending into said base from the top surface thereof.

* * * * *